United States Patent [19]

Krecker

[11] 4,207,484
[45] Jun. 10, 1980

[54] SUPPORT APPARATUS FOR AN ELECTRICAL ROTARY MACHINE

[75] Inventor: Wolfgang Krecker, Vasteras, Sweden

[73] Assignee: ASEA Aktiebolag, Vasteras, Sweden

[21] Appl. No.: 886,719

[22] Filed: Mar. 15, 1978

[30] Foreign Application Priority Data

Mar. 18, 1977 [SE] Sweden .............................. 7703097

[51] Int. Cl.² .............................................. H02K 5/00
[52] U.S. Cl. ........................................ 310/91; 310/89; 310/258; 248/674
[58] Field of Search ...................... 310/91, 89, 90, 254, 310/258; 248/19, 26

[56] References Cited

U.S. PATENT DOCUMENTS

| | | | |
|---|---|---|---|
| 3,114,061 | 12/1963 | Michel | 310/89 |
| 3,544,823 | 12/1970 | Chigirinsky | 310/89 |
| 3,671,790 | 6/1972 | Widstrand | 310/254 |
| 3,870,909 | 3/1975 | Pangburn | 310/91 |
| 3,916,233 | 8/1975 | Vockler | 310/89 |
| 3,988,622 | 10/1976 | Starcevic | 310/89 |
| 4,015,155 | 3/1977 | Lang | 310/89 |

*Primary Examiner*—R. Skudy
*Attorney, Agent, or Firm*—Pollock, Vande Sande & Priddy

[57] ABSTRACT

An electrical rotary machine wherein a plurality of hollow tubular axial support beams are affixed to a stator of the rotary machine and the top surface of the beams supports the stator in a horizontally aligned operational position. The rotor of the machine is supported by solid transverse support walls that are positioned at opposite ends of the rotor, at right angles to the axial support beams and adjacent to their end surfaces. The support walls are affixed to the ends of the axial beams and adapted to support attached bearing housings. When the support walls are in position, the shaft of the rotor engages the bearings in the bearing housings and the rotor is thereby rotatably supported. Stability is enhanced by ensuring that the vertical distance between the lowest point of the stator and the top support surface of the beams is greater than one-half the vertical distance between the top support surface and the base surface upon which the rotary machine is supported.

2 Claims, 3 Drawing Figures

SUPPORT APPARATUS FOR AN ELECTRICAL ROTARY MACHINE

BACKGROUND OF THE INVENTION

The invention relates to an electrical rotary machine of at least 100 kW and, more particularly, to a machine including axial support means to support a stator of the machine in an operative position and transverse end support means to rotatably support a rotor of the machine in operative alignment with the stator.

It is shown in the art to use a rectangular frame comprising welded axial and transverse hollow beams to support the stator and rotor of an electrical rotary machine. Such a support structure is disclosed in the U.S. Pat. No. 3,114,061, wherein the transverse hollow beams of the support apparatus include bearing holders that rotatably support the rotor and the axial tubular beams support the stator.

The prior art frame support structure generally requires a more complicated machine manufacturing process than a frame structure according to the invention. In addition, the hollow transverse support beams generally require a more complex means to attach bearing carriers for engagement with the rotor. Moreover, it is noted that the axial and transverse support functions of a rotary machine support apparatus are different and therefore, differing transverse and axial support means must be employed to effectively and efficiently provide the necessary support with simple and easily constructed support components.

Accordingly, it is an object of the invention to provide a simple and effective means to support a rotor and a stator of a rotary machine in operative alignment.

A further object of the invention is to provide such a support means that is easy to construct and that facilitates the mounting and dismounting of a rotor or stator.

Another object of the invention is to provide a simple means to mount transverse bearing holders with radial adjustability for rotatably supporting the rotor of the rotary machine.

A further object of the invention is to provide a means to mount transverse bearing holders for rotatably supporting the rotor of the rotary machine.

A further object of the invention is to provide a means to mount or dismount a rotor or a stator from a support structure by a simple horizontal movement.

Another object of the invention is to provide such a simple and easily assembled support structure that uses the position of the stator to provide increased stability.

These and other objects of the invention will become apparent from a review of the detailed specification which follows and a consideration of the accompanying drawings.

BRIEF SUMMARY OF THE INVENTION

In order to achieve the objects of the invention and to overcome the problems of the prior art, the rotary machine support apparatus, according to the invention, includes hollow tubular support beams that provide axial support for a stator and transverse end plates in the form of solid walls that provide rotary support for a rotor of the machine. Each end of the hollow, tubular support beams has a vertical end surface, which faces a vertical surface belonging to an end wall.

The tubular support beams are attached to outer surface projections on the stator and the weight of the stator is supported on a top support surface of each of the beams. Foot plates and intermediate stiffening plates are attached to the underside of the beams in order to uniformly contact a ground support surface to footing surfaces belonging to the foot plates and to thereby support the weight of the rotary machine. A detachable bottom screen is adapted to be connected to the support beams to shield the components of the machine from support surface debris.

Solid end walls are affixed at opposite ends of the support beams and each wall has an opening adapted to a corresponding bearing housing in such a manner that air gap adjustments can be carried out by a radial movement of the bearing housings. The bearing housings are pressed against vertical wall surfaces by means of horizontal bolts and thus affixed to the walls by friction. Bearings in the housings engage the shaft of the rotor to provide a rotatable rotor support.

If at least one end wall is detached from connection with the hollow support beams, the rotor and stator can be mounted or dismounted by a simple horizontal movement with respect to the axial support beams.

The stability of the machine is enhanced if the vertical distance between the lowest point of the stator and the top beam support surface is greater than one half the vertical distance from the top support surface of the beam to the ground support surface.

DETAILED DESCRIPTION OF PREFERRED EMBODIMENTS

Figure 1:
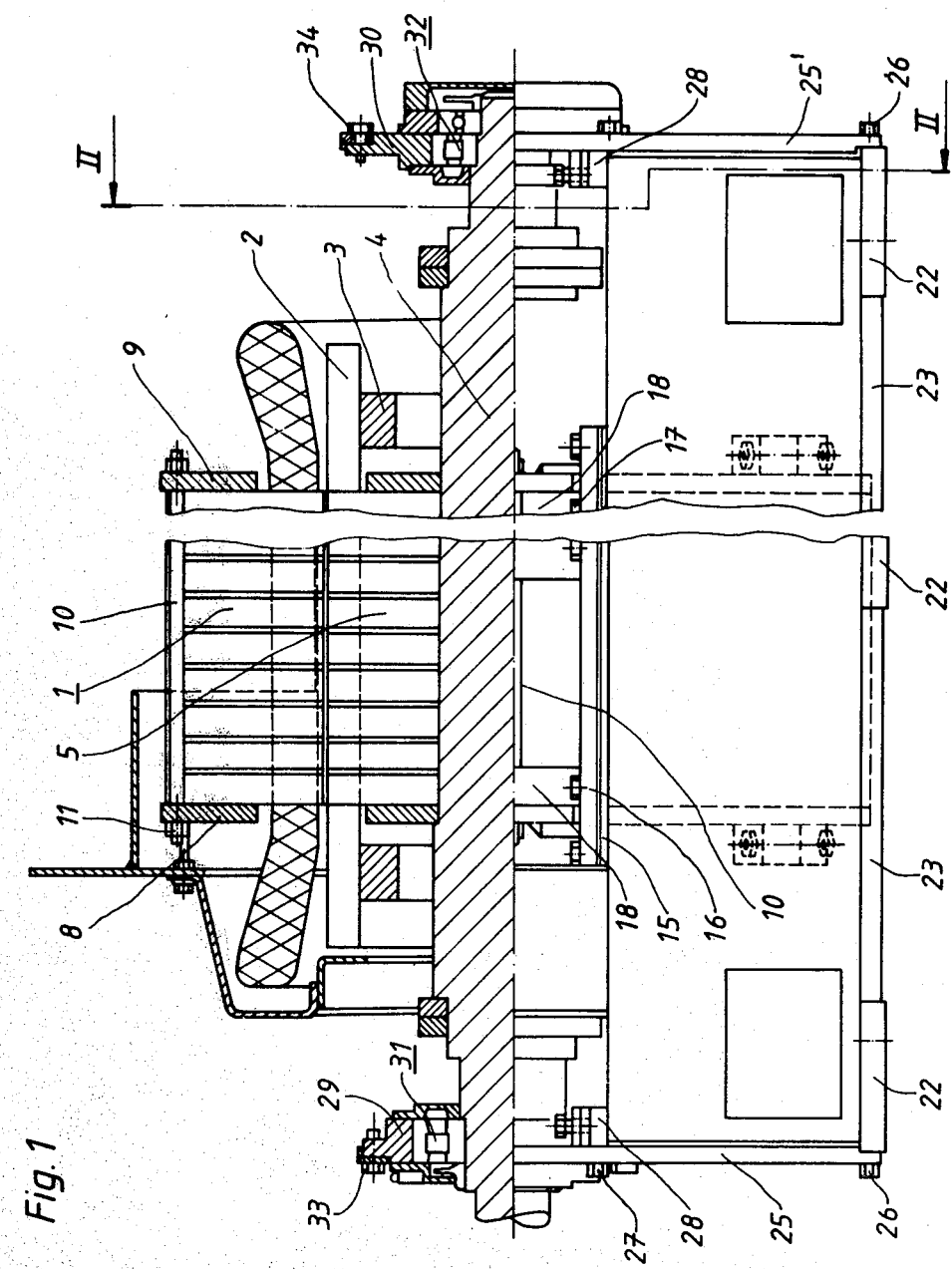
FIG. 1 shows a side view of the rotary machine of an embodiment of the invention.

The remaining portion of this specification will describe preferred embodiments of the invention when read in conjunction with the attached drawings, in which like reference characters identify identical apparatus.

FIG. 1 illustrates a preferred embodiment of the invention wherein a rotor 5 is constructed, for example, as a squirrel cage winding and the rotor winding rods 2, short circuit rings 3 and rotor shaft 4 are arranged in a manner known to the art. The rotor 5 is enclosed by a laminated stator core 1 and the circumference of each stator lamination is defined by a circular arc 6 and a straight line 7.

The stator laminations are compressed between two opposing press rings 8 and 9 which are secured by a plurality of draw bolts 10 that are threaded and provided with nuts 11. The press rings 8 and 9 have a circular outer contour that is interrupted by a pair of upper radial projections 12 and a pair of lower radial projections 13.

In accordance with the invention, the stator rests on two axially oriented stator support members 14. The support members of the embodiment are hollow tubular means which provide a strong, lightweight, and rigid support structure.

The support members 14 include a horizontal supporting plate 15 that supports a sole 16 that is affixed to the upper radial projections 12 of the press rings 8 and 9. More particularly each sole 16 is connected in a force-transmitting manner to the stator core 1 by a number of supports 18 that may be welded or otherwise affixed between the sole 16 and adjacent draw bolts 10 of the stator core 1. Each sole 16 is attached to its corresponding supporting plate 15 by a plurality of bolts 17 that are screwed to the supporting plate 15. Thus, a rigid supporting connection is provided between the support members 14 and the stator core 1.

A further stator support connection is provided by affixing the lower projections 13 of the press rings 8 and 9 to an inner side of the support members 14. More particularly, a stator tab 19 is welded to each of the lower projections 13 and the tabs 19 are attached by screw bolts 21 to shoulders 20 that are welded on the inner sides of the support members 14.

Figure 2:
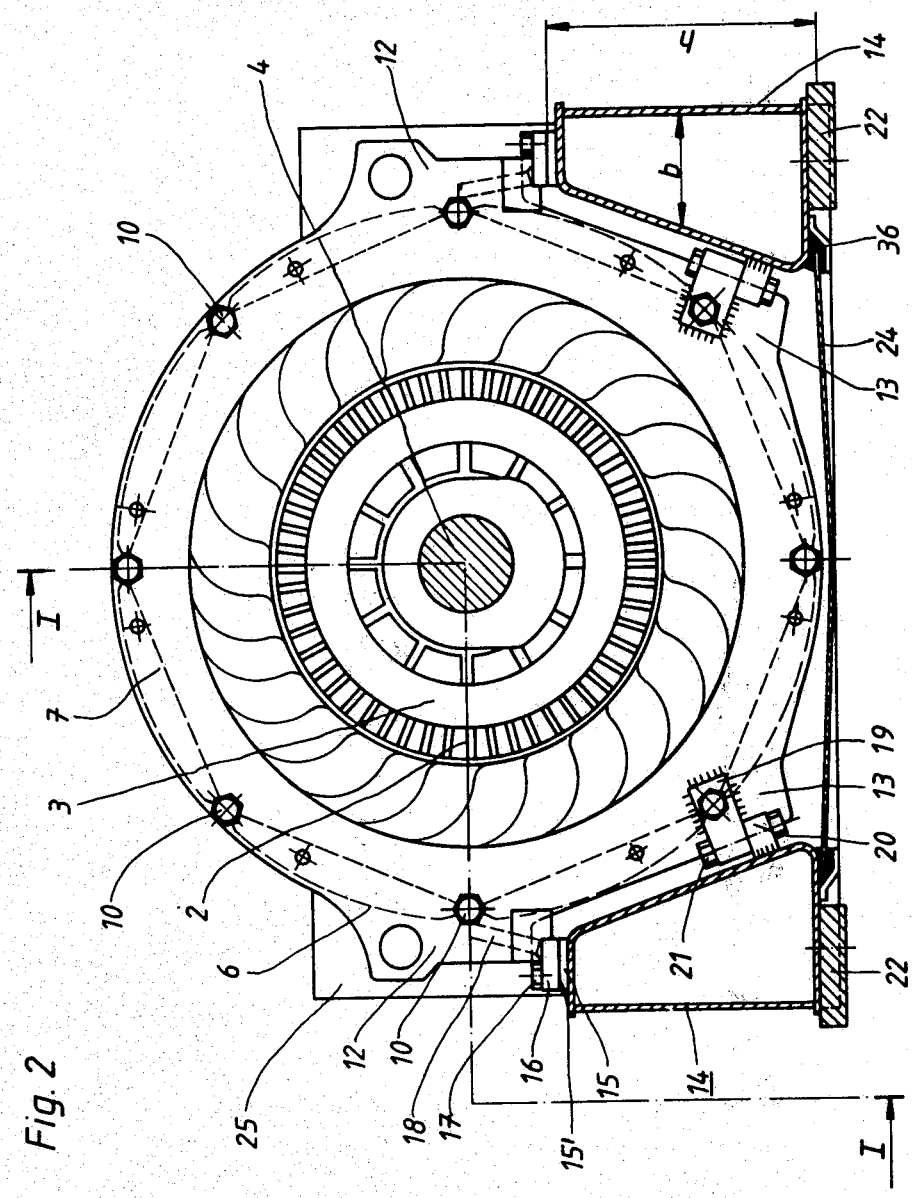
FIG. 2 shows a cross sectional view along II—II of the embodiment of FIG. 1, with ventilation shields and hood removed.

It is noted that the hollow tubular beam support members 14 of the embodiment of the invention may be manufactured of sheet metal and formed, as shown in FIG. 2, with a trapezoidal cross-section. A plurality of foot plates 22 are affixed, for example by welding, to the bottom of the support beams 14 in order to uniformly contact a horizontal support surface. In addition, intermediate stiffening plates 23 are provided to cooperate with the foot plates 22 to support the stator core 1 on the support surface.

A bottom screen plate 24 is attached to the support beams 14 by screws (not shown) and a sealing compound 36, for example self-curing plastic, in order to protect the bottom of the machine from dust or other debris. It should be appreciated that the bottom screen plate 24 is not necessary to provide support for the rotary machine and therefore, the machine can be operated with the plate 24 removed. It is noted that the plate 24 can be attached at any suitable time, for example during installation.

The rotor of the machine is supported, in accordance with the invention, by two end walls 25 and 25' which are positioned at opposite ends of the machine, adjacent to vertical end surfaces of the hollow beams 14 and at right angles to these beams. The end walls are rigidly attached to the ends of the beams 14 by means of screw bolts 26 and 27 which are screwed into foot plates 22 and fastening blocks 28 that are welded to the beams 14. The end walls 25 and 25' and the beams 14 constitute a mainly rectangular frame.

It should be appreciated that the thickness of the end walls can, typically, be less than one-half of the average thickness b of a hollow tubular beam 14. However, the invention is not limited to any particular thickness of the end wall.

Figure 3:
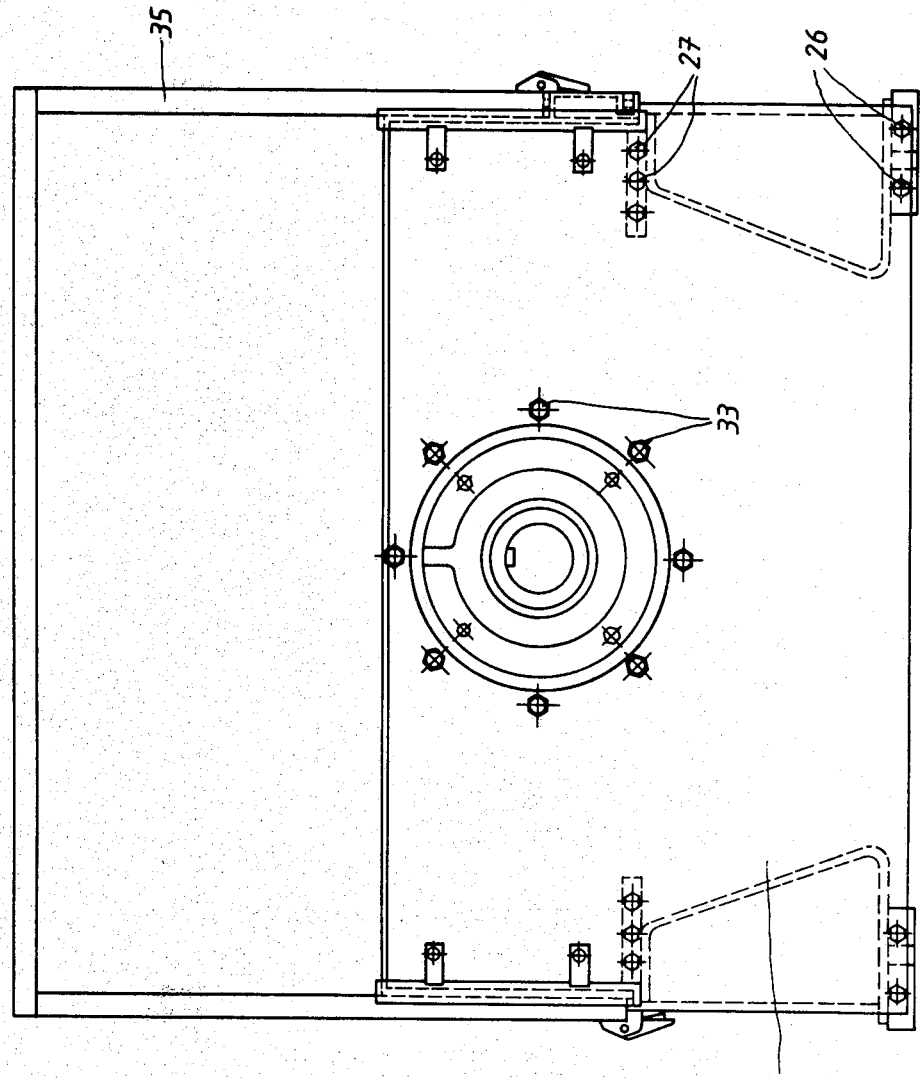
FIG. 3 shows an end view of the embodiment of FIG. 1 with the hood attached.

As shown in FIG. 3, a protective hood 35 is attached in an abutting relation to the upper edges of the end walls and the support beams 14. In addition, each of the end walls has a circular opening in which associated bearing housings 29 or 30 enclose their respective bearings 31 and 32 and are adjustably affixed by means of friction forces to their respective end walls 25 and 25' by screw bolts 33 and 34. The screw bolts 33 and 34 are inserted into through-going holes in the walls 25 and 25' with such a play that sufficient radial adjustability of the bearing housing is obtained.

In accordance with the invention, the opposite ends of the rotor shaft 4 rotatably engage the bearings 31 and 32 of the bearing housings 29 and 30 and the rotor assembly 5 is thereby rotatably supported by the bearing housings 29 and 30 and the associated attached end walls 25 and 25'. The transverse end walls 25 and 25' are, in turn, rigidly affixed to the axial stator support members 14 in order to strongly support the components of the rotary machine in operative alignment.

It should be appreciated from the above discussion that if at least one end wall of the apparatus of the invention is detachably mounted to the end of a support beam 14, it will be possible to detach the end wall and position the stator core 1 of the rotary machine on the support beams 14 by means of a single horizontal movement of the stator. In addition, it will be possible to remove the rotor 1 of the machine without dismantling the stator, by merely detaching an end wall and sliding out the rotor 1. The end wall can then be made without any slot for radial movement of the shaft out of the opening in the end wall. Such a slot reduces the mechanical strength of the end wall. For this reason it is often preferable that the periphery of the hole constitutes a closed curve.

Furthermore, it is noted that the support apparatus of the invention has greater support stability if the vertical distance h between the lowest point of the stator and the surfaces formed by the supporting plates 15 is greater than one-half the vertical distance between the supporting surfaces 15 and the horizontal footing surfaces of the foot plates 22. The footing surfaces are in contact with the base support surface.

It should also be appreciated from the above discussion that the invention includes embodiments wherein either one or both of the end walls 25 and 25' are permanently affixed to the ends of the support beams 14, for example by welding. Of course, if both of the end walls are permanently affixed to the support beams 14, it will be necessary to provide a means to engage or to disengage the rotor 1 from the support structure. Accordingly, the end walls 25 and 25' could be provided with an upward slot or recess for the bearing housings. The recess would allow the rotor 1 to be mounted or dismounted upon movement in an outward radial direction.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A rotary electrical machine of at least 100 kW comprising a stator with a laminated stator core, two press rings and a plurality of draw bolts arranged therebetween, and a rotor surrounded by the stator core and furnished with a horizontal shaft, said machine being supported by a substantially rectangular frame with two axially oriented frame portions supporting said stator and two transversal frame portions connecting said axially oriented portions with each other and supporting said rotor, each of said axially oriented frame portions being a tubular, hollow sheet metal beam provided with vertical end surfaces, lower parts of said hollow beams being provided with horizontal footing surfaces, and upper parts of said hollow beams being provided with supporting surfaces lying in a horizontal plane and supporting said stator, the lowest point of said press rings being located below said supporting surfaces and at a vertical distance (h) therefrom which is greater than half the distance between these and said footing surfaces, each of said transversal frame portions being a vertical wall,
  the thickness of which is less than one-half of the average thickness of one of said tubular beams, each of said walls being arranged at two of said vertical end surfaces and in rigid mechanical connection with said hollow beams, at least one of said end walls being detachably attached to the hollow beams by means of a plurality of screw bolts, each rotor bearing being surrounded by a bearing housing supported by a said wall, said bearing housing being arranged by means of a plurality of horizontal screw bolts in frictional connection with a vertical surface of the wall.

2. A rotary electrical machine according to claim 1, in which the rotor shaft, at least at one of said end walls is arranged in a through-going hole, the periphery of the hole constituting a closed curve.

* * * * *